United States Patent [19]
Schauffler

[11] 3,933,326
[45] Jan. 20, 1976

[54] OBSERVATION/INTERPRETATION SYSTEM

[76] Inventor: Peter P. Schauffler, 5200 Battery Lane, Bethesda, Md. 20014

[22] Filed: May 1, 1975

[21] Appl. No.: 573,749

Related U.S. Application Data

[63] Continuation-in-part of Ser. No. 386,935, Aug. 9, 1973, abandoned.

[52] U.S. Cl.................. 244/33; 244/118 P; 272/18
[51] Int. Cl.² ........................................... B64B 1/50
[58] Field of Search............... 244/17.27, 25, 26–31, 244/33, 5, 118 P; 46/88, 89; 272/16–18; 104/83, 84; 350/117

[56] References Cited

UNITED STATES PATENTS

| | | | |
|---|---|---|---|
| 530,128 | 12/1894 | Rosenzwey | 272/17 |
| 844,676 | 2/1907 | Hager | 244/5 |
| 853,898 | 5/1907 | Rice | 272/16 |
| 1,396,489 | 11/1921 | Williams | 244/33 |
| 1,658,290 | 2/1928 | Koun | 244/5 |
| 1,741,446 | 12/1929 | Turner | 244/26 |
| 1,874,423 | 8/1932 | Belleville | 244/33 |
| 2,364,369 | 12/1944 | Jelley et al. | 350/117 |
| 2,433,344 | 12/1947 | Closby | 244/33 |
| 2,861,806 | 11/1958 | Disney | 272/18 |
| 3,087,690 | 4/1963 | Doman et al. | 244/17.27 |
| 3,096,047 | 7/1963 | Dunn | 244/26 |
| 3,292,304 | 12/1966 | Wolfe | 46/89 |
| 3,628,829 | 12/1971 | Heilig | 272/16 |

FOREIGN PATENTS OR APPLICATIONS

| 65,908 | 11/1947 | Denmark | 272/18 |
|---|---|---|---|

OTHER PUBLICATIONS

"Plane Tips" Engineering Education Program, No. 24, Mar. 27, 1945.

"Cabin Seating Details of L-1011 Shown," Aviation Week, Apr. 15, 1968, pp. 40–41.

Primary Examiner—Trygve M. Blix
Assistant Examiner—Galen L. Barefoot
Attorney, Agent, or Firm—Woodcock, Washburn, Kurtz & Mackiewicz

[57] ABSTRACT

An integrated all-weather observation/interpretation system in which a lighter-than-air vehicle ascends to a stationary position above the surface with a suspended gondola which carries passengers so that they can observe the surrounding area and experience a directly related interpretation program. The gondola includes a suitable observation window as well as a slide or motion-picture projection device, with audio and olfactory accompaniment, to provide a juxtaposed interpretation. The vehicle is raised, lowered and rotated through strategically placed electrically powered rotors and/or ground-based electric winches and elevation lines and/or a pantograph operating from a turntable inside the vehicle's ground nest. Screens on the ground are also provided for slide or motion-picture projection to simulate the view under weather conditions when the vehicle cannot be elevated.

8 Claims, 12 Drawing Figures

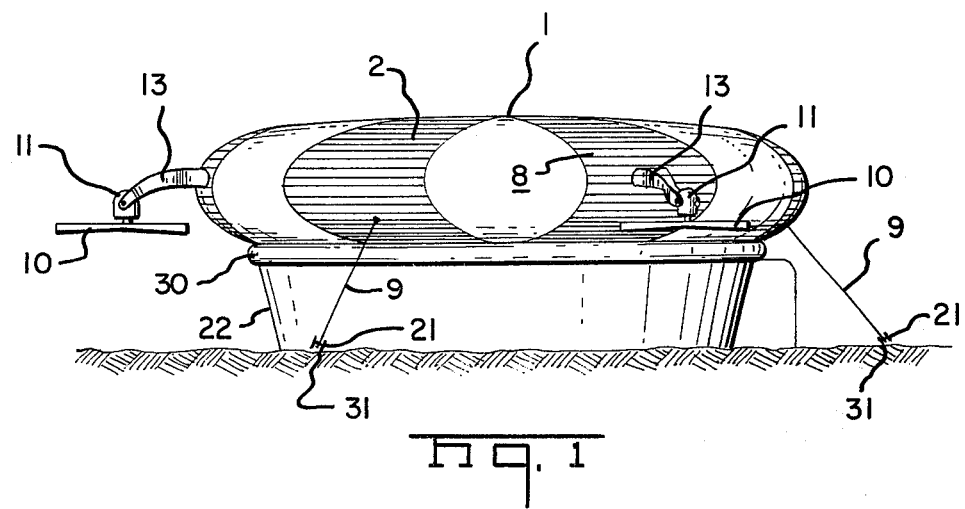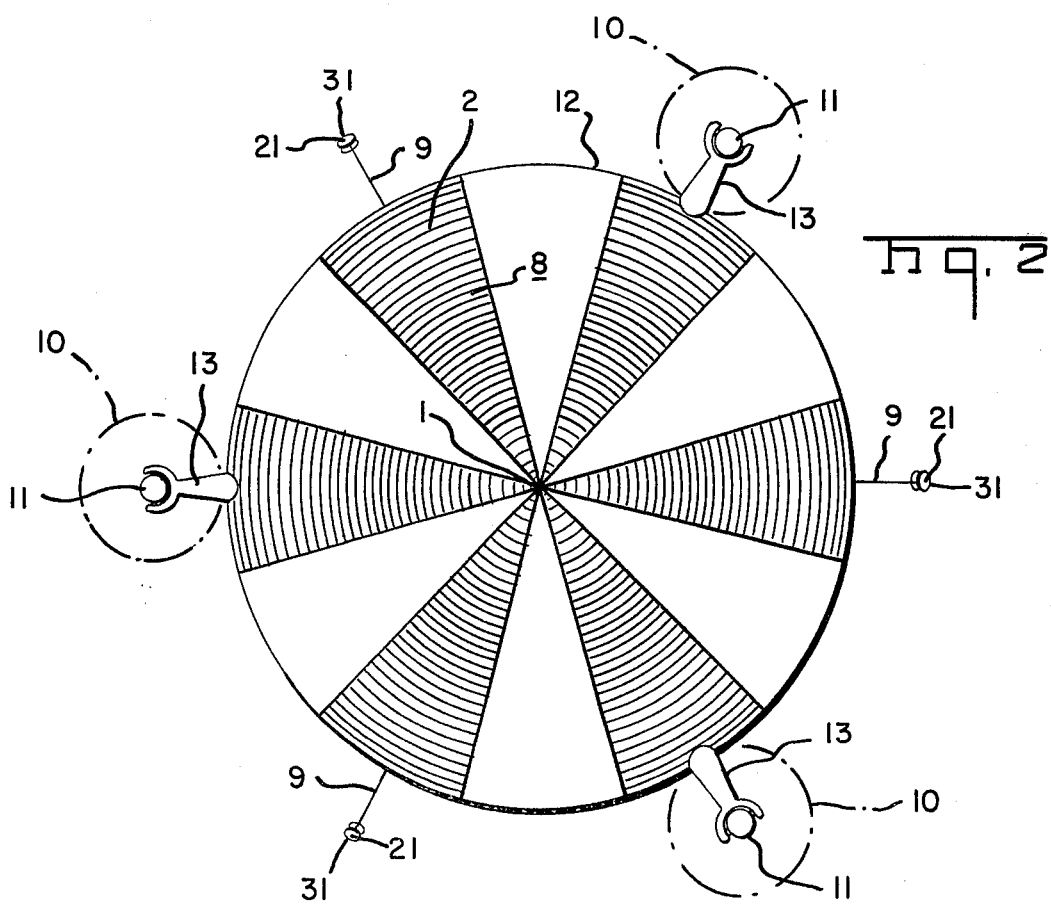

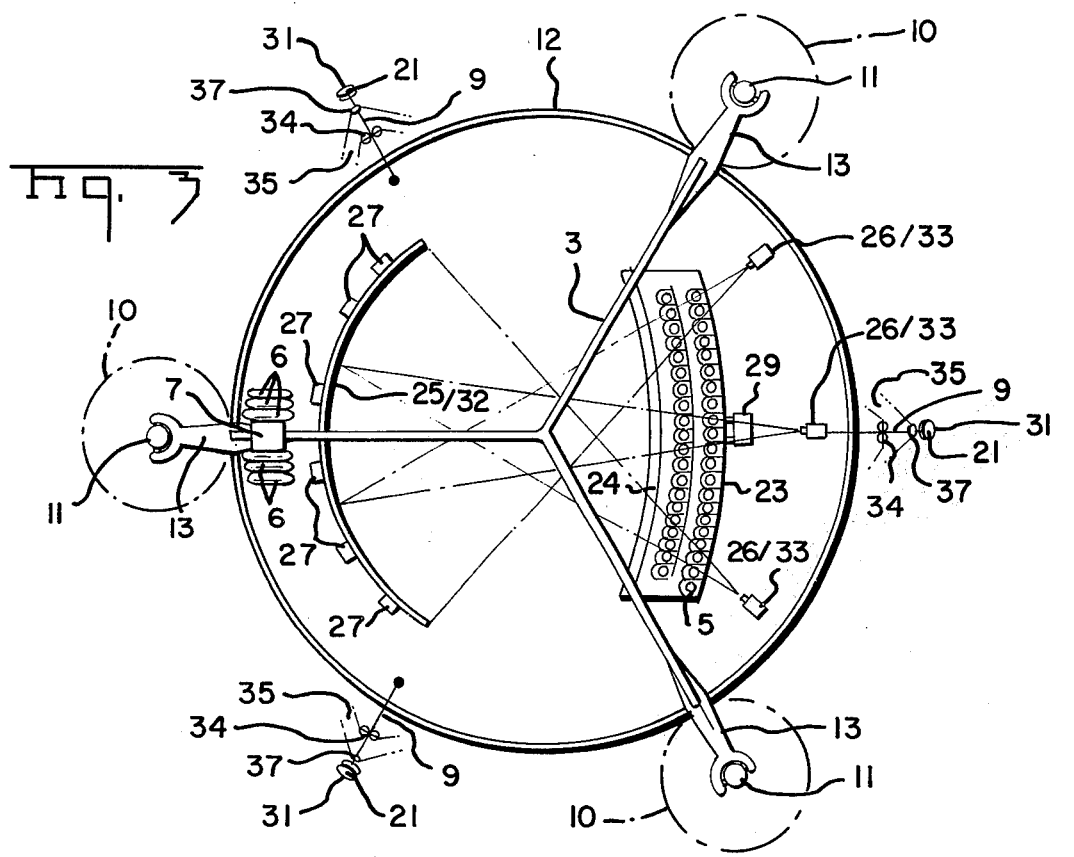
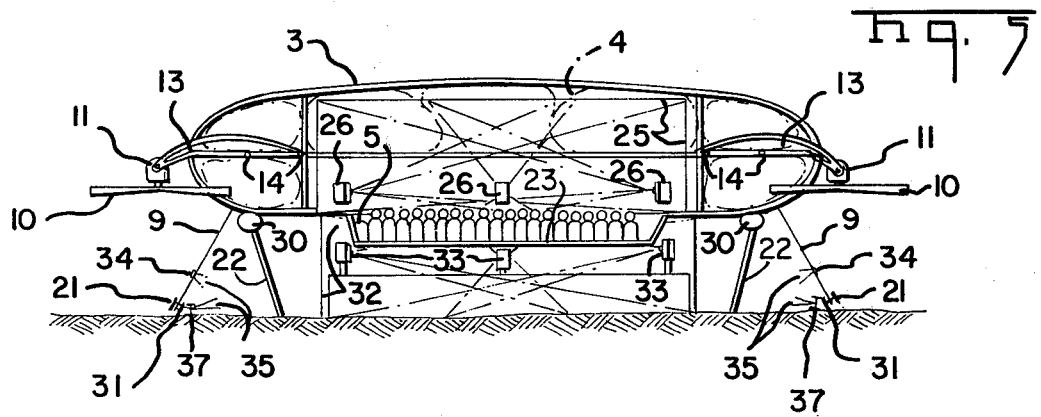
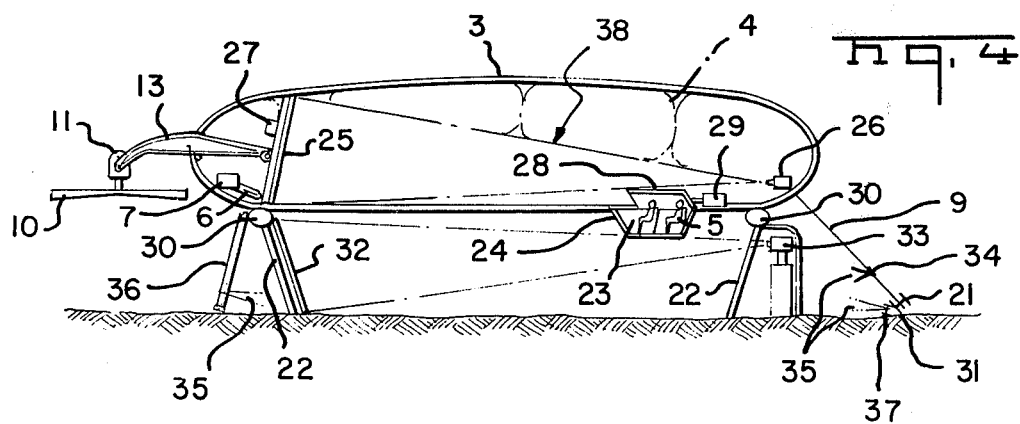

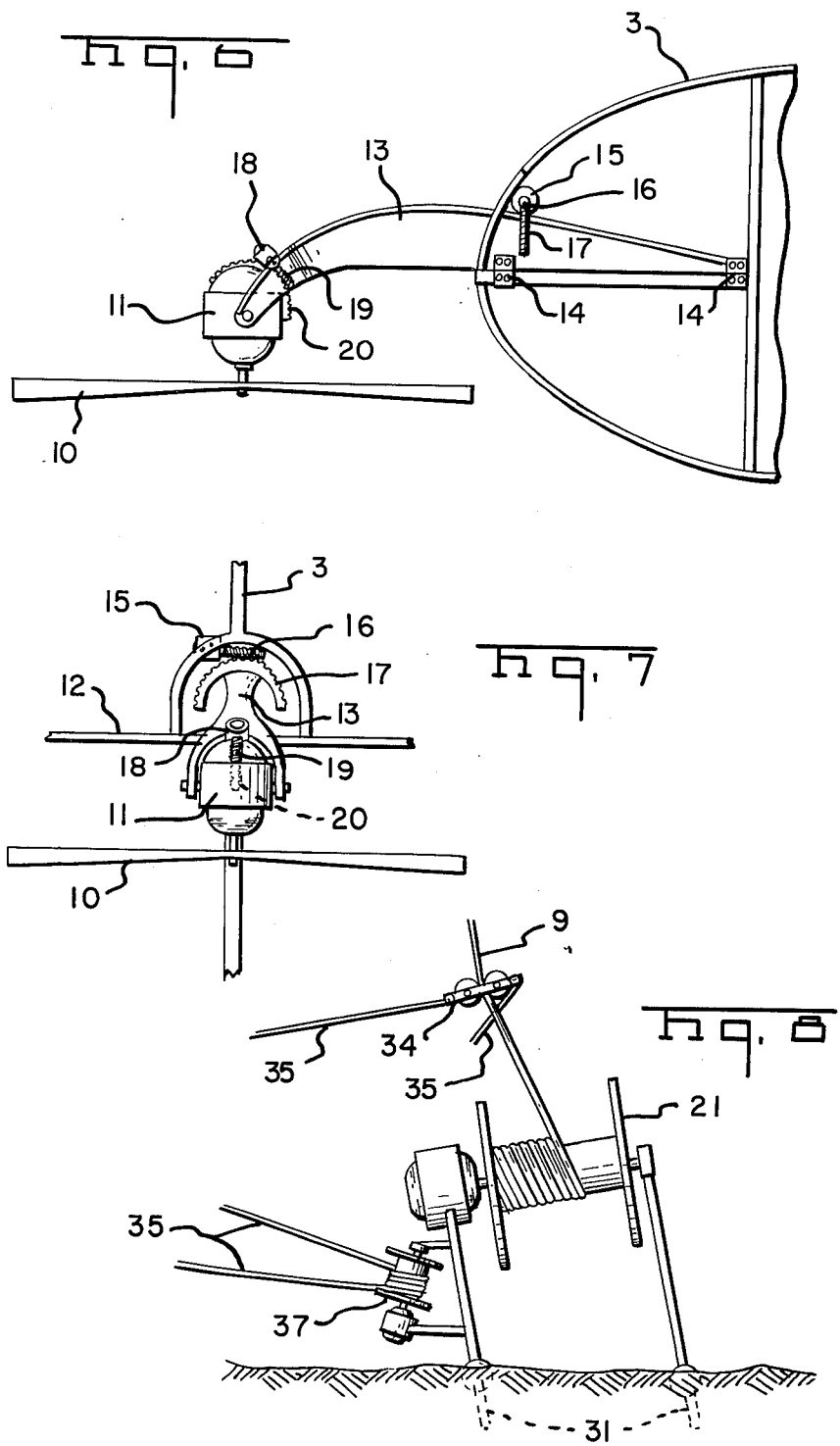

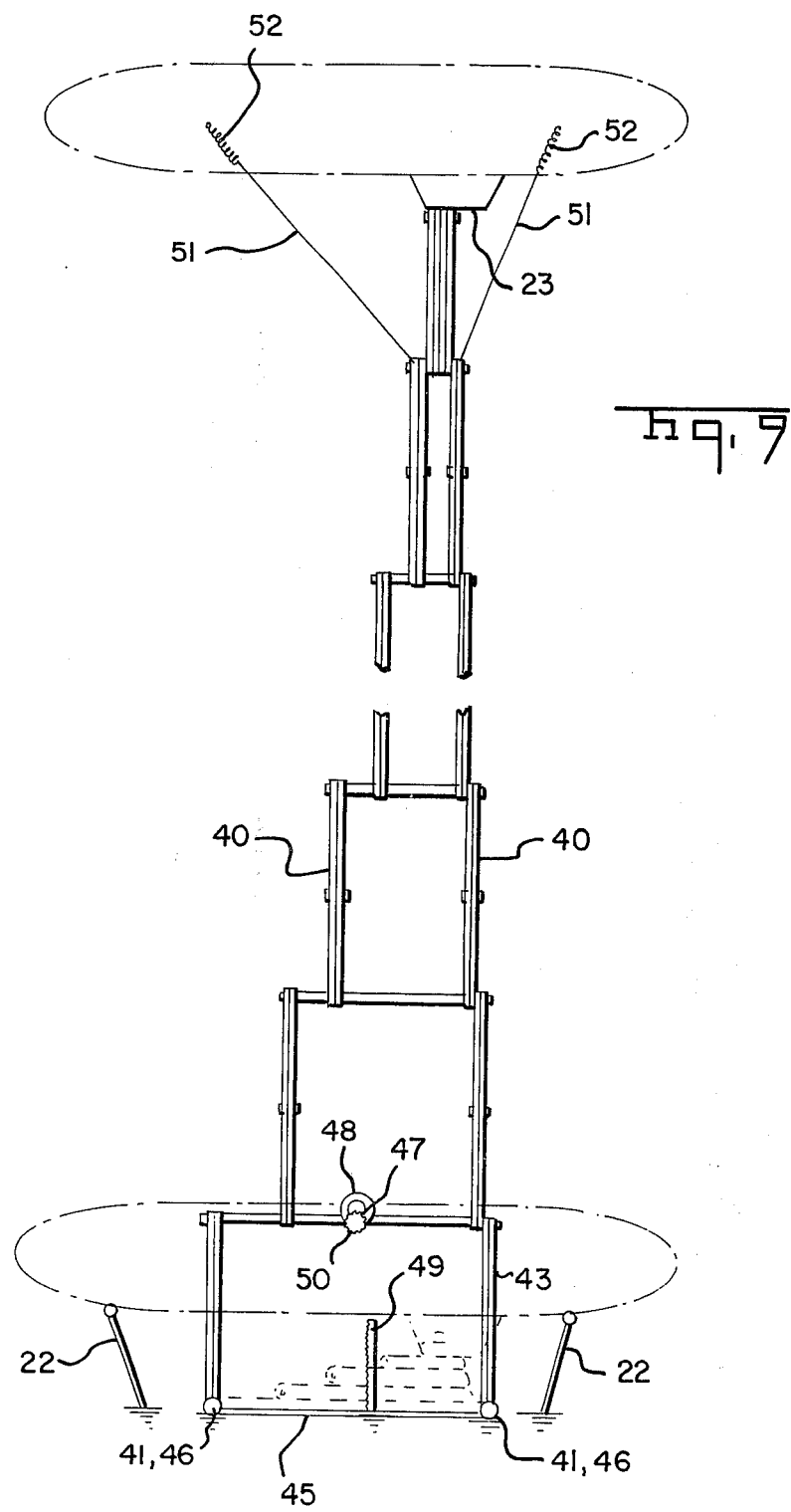

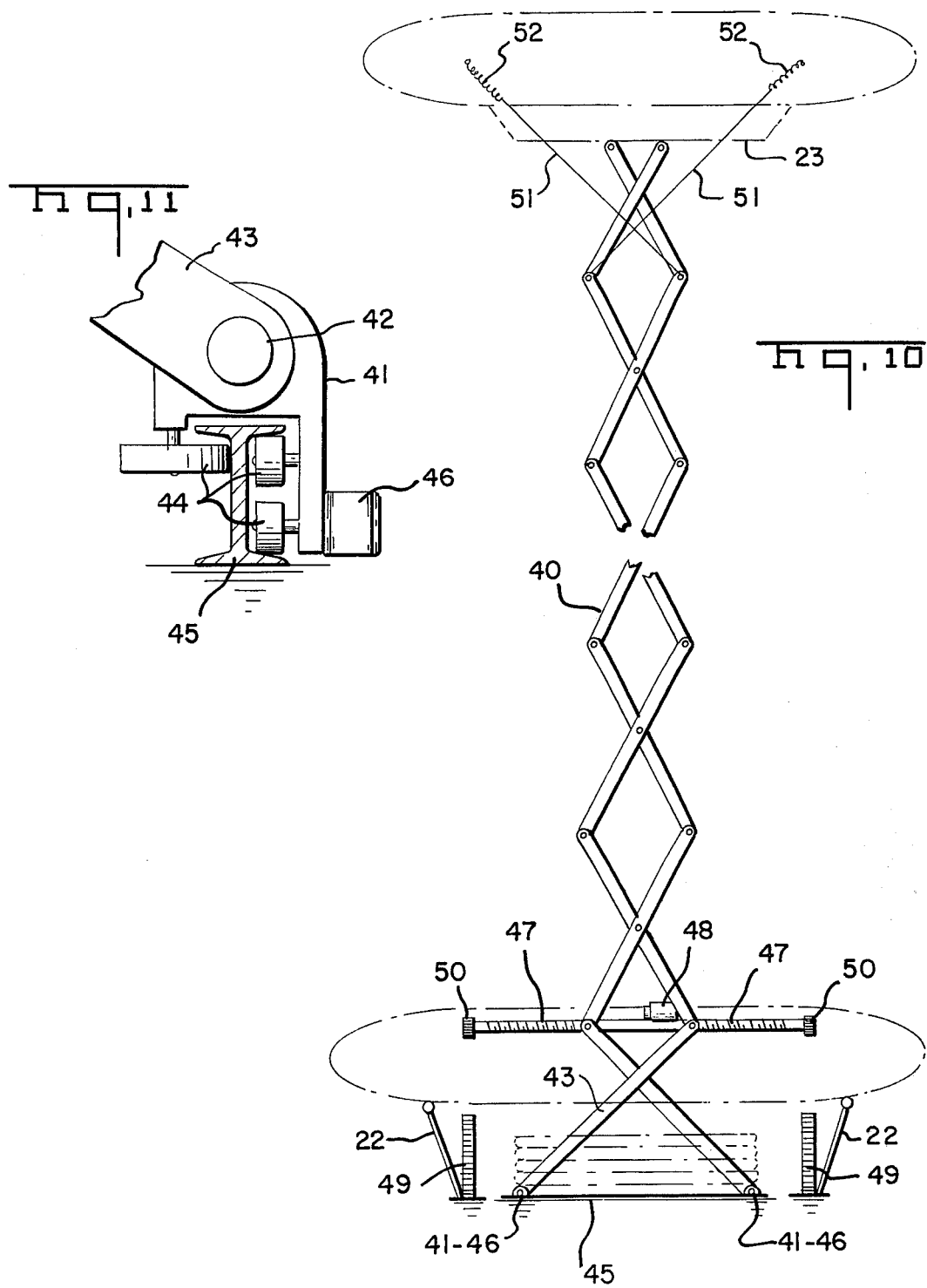

OBSERVATION/INTERPRETATION SYSTEM

BACKGROUND AND SUMMARY OF THE INVENTION

This application is a continuation-in-part of application Ser. No. 386,935, filed Aug. 9, 1973, now abandoned.

Lighter-than-air vehicles which are maintained in a stationary, elevated position are known and have been used for a number of different purposes. Yet, the unique and efficient characteristics of such a means have not been exploited so as to elevate an observation gondola for the purpose of providing the passengers of such a vehicle the opportunity to view the surrounding area in an informative and dramatic manner.

Accordingly, it is an object of this invention to provide for a rotatable, lighter-than-air craft consisting of a large, light, ellipsoid-shaped element which will provide the static lift through numerous lighter-than-air gas bags contained therein, as well as a bank of gas flasks to provide additional, adjustable buoyancy, together with a suspended gondola especially suitable for comfortably raising a number of passengers to an elevated, stationary position and providing the means conducive to an extensive view and juxtaposed interpretation of the surrounding area.

It is an additional object of this invention to provide for the gondola to contain a curved transverse compartment with one or more rows of seats facing a slanted window which will provide passengers with a wide section view extending from the horizontal plane downward almost to the vertical plane.

It is a further object of this invention to provide a means whereby scenes which would be observable through the gondola window during a flight at a particular location can be simulated on a curved screen outside and below said window for the passengers' enjoyment in the event that ascent is not possible.

It is further an object of the invention to provide means by which supplementary illustrative maps and pictures may be projected directly above the window through sound-accompanied slide or motion-picture projection, such projections being programmed to be in phase with the view afforded by a particular position.

It is a further object of the invention to supply further supplementary illustrative features within the gondola including such aids as multi-lingual narration through selectable tape channels and scent-dispensing features using the gondola's ventilating system.

It is further an object of the invention to provide the vehicle with a number of electrically powered rotors versatilely mounted on the hull's perimeter to allow controlled rotation of said vehicle about a vertical or horizontal axis as well as allowing vertical or horizontal movement of the craft itself.

Another object of the invention is to effect ascent and descent of the vehicle by a series of electric winches securely moored to the ground outside the nest, the winches feeding out or pulling in the elevation lines which are connected to the craft. Tandem-sheave pulleys ride on the elevation lines and are connected by rotation lines to additional electric winches to effect rotation about the vertical axis.

As an alternative or supplement to the above means for positioning the vehicle above the surface for observation purposes, it is a further object of the invention to accomplish the raising/lowering and vertical-axis rotation of the vehicle by means of an electrically or hydraulically operated double pantograph secured at the top to the underside of the vehicle's gondola and at the bottom to a turntable located inside the vehicle's ground nest.

DESCRIPTION OF THE DRAWINGS

FIG. 1 is an external fore-and-aft elevation of the vehicle and ground nest;

FIG. 2 is an external plan view of the vehicle;

FIG. 3 is a cutaway plan view of the vehicle showing the hull framework, rotor motors and arms, control lines and winches, gondola, projectors and screen;

FIG. 4 is a vertical section of the vehicle and ground nest along the fore-and-aft center line;

FIG. 5 is a cutaway transverse elevation of the vehicle and ground nest;

FIGS. 6 and 7 are enlarged elevations along and across the center line of a rotor-angle-adjustment arm to indicate propulsion and control details;

FIG. 8 is a side elevation of an elevation-winch and rotation-winch control unit;

FIG. 9 is a fore-and-aft elevation of the vehicle and pantograph and ground nest, showing the vehicle in an elevated position;

FIG. 10 is a transverse elevation of the vehicle and pantograph and ground nest, again showing the vehicle in an elevated position;

FIG. 11 is a cross-section through the turntable I-beam and pantograph foot, to indicate the means of securing and rotating the pantograph.

DESCRIPTION OF A PARTICULAR EMBODIMENT

Figure 12:
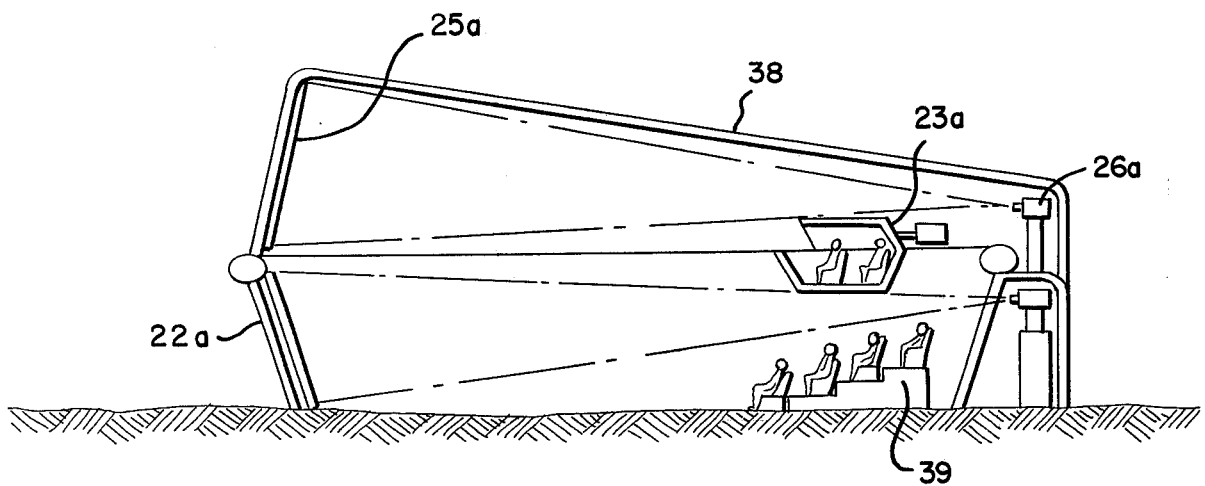
FIG. 12 is a side elevation of a modification of the invention to simulate the vehicle operation.

The hull 1 (FIGS. 1–5) of the vehicle is an ellipsoid formed on the minor axis, with an exterior consisting of opaque rubberized fabric 2 shaped by a light metal or wooden skeleton 3 and with a flattened bottom.

Lighter-than-air gas to provide static lift is contained in several light plastic bags 4 within this ellipsoid, each bag being connected by a plastic tube to a central gas-control manifold at the pilot's position 5. (For a lifting capacity of 40 passengers, using helium, suitable major and minor axes for the oblate ellipsoid can be approximately 120 feet and 25 feet, respectively.)

Also connected to this manifold are a bank of gas flasks 6 to provide additional buoyancy when required to offset possible leaks or increases in gross weight and a compressor 7 to recharge these flasks from the gas bags when reducing buoyancy or to pump from one bag to another when adjusting the vehicle's trim.

The surface of the ellipsoid can be colored with alternate red and white segments 8 for aeronautical identification.

Electric power for propelling and controlling the vehicle, heating or cooling the gondola and presenting the interpretation of points of interest can be supplied through a ground-fed power cable 9 connected to the stern (or by light batteries, fuel cells or generators and engines if increased flexibility justifies the added weight.)

Propulsion can be provided by rigid rotors 10 driven by electric motors 11 positioned at suitable points (three on the hull's perimeter ring 12 in this illustration). These motors can be mounted on arms 13 (FIGS. 6–7) fastened as by hinges 14 to the hull frame 3 and capable of being rotated around the arm axis. The arm-angle setting can be made remotely from a control console at the pilot's position 5 as by a switch connected to a small electric motor 15 which drives a worm gear 16 meshed with a curved rack 17 on each arm. The motor-tilt setting can be made in similar fashion by an additional electric motor 18 and a worm gear 19 which meshes with a curved rack 20 on the casing of the rotor motor 11. The direction and speed of rotation of each rotor can be controlled as by switches and rheostat in the control console of 5 at the pilot-position and/or on the ground which determine the polarity and amount of current going to the rotor motor.

By the combined selection at the control console of arm angle, motor tilt and rotor-rotation direction and speed, for each rotor, the vehicle can be moved vertically and horizontally and rotated about the vertical and both horizontal axes. It can be maneuvered in any desired manner by a simultaneous or sequential combination of these movements and rotations, providing great flexibility in achieving and maintaining any desired position.

The vehicle can thus be operated from compact landing areas including small parks, barges and the tops of buildings. Landings can be assisted with the power cable 9 (FIGS. 1–5) as by means of an electrically driven winch 21 anchored behind the ground nest 22 and controlled from the pilot's position 5 (and/or a ground station).

The vehicle's gondola 23 is a curved transverse compartment with one or two rows of staggered seats (totaling 40 in this illustration) which face forward, with double doors at each end so that each row can be simultaneously unloaded at one end and loaded at the other. The wall immediately in front of these seats consists of a slanted window 24 of clear plastic, providing passengers with a wide-sector view extending from the horizontal plane downward almost to the vertical plane. Immediately above this window, and recessed to provide the necessary darkness and comfortable viewing distance, is a slanted and curved screen 25. As by means of one or more slide or motion-picture projectors 26, detailed maps and illustrations showing the relationships, history and physical details of the points of interest observable from the window can be displayed on the adjacent portions of this screen. Passengers can thus orient and inform themselves continuously with material pertaining to these points of interest in each sector. (In an alternative or supplementary arrangement, using a partially-reflective plastic film pulled down over the inside of the window, a perspective drawing identifying the points of principal interest can be projected directly on the window and thus superimposed on the outside field.)

A narrative and musical score to accompany the observed scene and the projected maps and illustrations can be presented as by sound-track or tape-actuated loudspeakers 27 behind the screen. This narrative and score can have separate sections corresponding to and synchronized with the sectors of the visual field — so that passengers hear commentary and music addressed to the particular points being observed as their seats swing through each sector. By the use of additional tape channels and earphones with a selector switch on a phone jack at each seat, this narrative can be presented in various languages and in various levels of detail to accommodate different passenger backgrounds and interests.

(To further convey the atmosphere of the scenes being observed, a plastic canopy 28 can be provided for the gondola and a scent-dispensing feature can be incorporated in the ventilating system 29 — permitting passengers to experience a succession of aromas [for example: vegetation, gunpowder smoke, cooking food, industrial fumes] which emphasize the historic or present-day significance of these scenes.)

A thin-shelled conical-section building 22, with a large low-pressure plastic tube 30 serving as a bumper and seal on its upper edge, can provide a suitable ground nest. The vehicle can be securely moored by lines 9 attached to its perimeter and hooked into anchored eyes 31 outside this nest.

To accommodate high-wind or poor-visibility conditions when vehicle ascents are not possible, the scenes observable through the gondola window 24 during a flight at any particular location can be simulated on a curved screen 32 inside the ground nest wall in front of and below this window as by one or more slide or motion-picture projectors 33.

To illustrate the variations possible in the design of this basic vehicle, it may be concluded in some situations that the required interpretation projection on the vehicle screen 25 and observed-scene simulation on the ground nest screen 32 can be provided adequately with narrower screens. For these situations, the transverse dimension of the vehicle hull 1 and ground nest 22 can be reduced somewhat.

As another illustration, the vertical and horizontal positioning and rotation functions performed by the vehicle's perimeter rotors 10 and motors 11 can be assisted (or performed instead) by light elevation lines 9 fixed to points near the perimeter and controlled by electric winches 21 on the surface outside the ground nest 22 — and operable both from the control console in the vehicle and from a ground control station (with one or more of these lines perhaps serving as the power cable). In this arrangement, rotation of the vehicle in either direction to change the passengers' viewing sector can be accomplished as by tandem-sheave pulleys 34 (FIG. 8) riding on the elevation lines 9 and connected by rotation lines 35 in two directions (running around roller bars 36 at the midpoints if necessary to avoid rubbing against the ground nest 22) to electric winches 37 at the bases of the other elevation line winches 21.

As a further illustration, the above means for vertical positioning and vertical-axis rotation of the vehicle can be supplemented or replaced by a double pantograph 40 (FIGS. 9 and 10) secured at the top to the underside of the vehicle's gondola 23 and at the base as by means of four feet 41 (FIG. 11) fastened by pins 42 to the bottom pantograph arms 43.

Rotation, vertical and horizontal support, and protection against tipping of the pantograph can be achieved as by rollers 44 on the insides of the flanges and web of a circular I-beam track 45 with the bottom roller actuated by an electric motor 46. The I-beam thus constitutes a turntable located within the vehicle's ground nest 22 (FIGS. 9 and 10).

Extension and retraction of the pantograph 40 to raise and lower the vehicle can be accomplished as by a horizontal hydraulic cylinder or by a double worm gear 47 positioned between a pair of the pantograph knees and driven by an electric motor 48.

Vertical gear racks 49 in the ground nest, which mesh with cogs 50 at the outer ends of the double worm gear 47, can provide a directly geared vertical force to assist the nesting and unnesting operation at the lower limit of the pantograph travel.

The maintenance of a horizontal vehicle position can be assisted as by light diagonal cables 51 between the top pantograph knees and the vehicle's perimeter ring, with springs 52 which keep the cables in the desired tension during the vehicle's vertical travel.

FIG. 12 shows a modification. As a transitional and evolutionary measure at some locations, the ground nest 22a can be equipped with an upper screen 25a and projectors 26a. The ground nest may have an opaque roof 38 and a stationary gondola 23a. This arrangement permits vehicle flights and observed-scene interpretations to be completely and continuously simulated; and viewing capacity can be increased by providing several rows of seats 39 below the gondola.

What is claimed is:

1. An integrated all-weather observation/interpretation system comprising:
    a lighter-than-air observation vehicle for transporting passengers above a scene of interest to provide said passengers with an advantageous vantage point for the observation of said scene,
    means for lifting said vehicle vertically, maintaining it at a point above the surface from which said scene can be viewed, rotating it for viewing various sectors of this scene, and returning it to the surface,
    an insulated cable for continuously providing electric power to said vehicle from the surface,
    a gondola under said vehicle which includes a plurality of seats facing an observation window extending from a horizontal plane substantially coincident with the passengers' normal view downward almost to a vertical plane and positioned so that said passengers can view said scene of interest therethrough,
    a darkened screen positioned directly above said horizontal plane and oriented with the direction of observation so that the passengers can observe both said screen and said window,
    means for internally projecting supplementary and interpretive images specifically related to the scene of interest onto said screen, with said images programmed and coordinated so as to coincide with said observation, and
    means for presenting audio programs coordinated with said observed scene of interest as supplemented with said images.

2. The invention recited in claim 1 further comprising:
    means for projecting a simulation of the scene observed through said window on a screen outside said window under weather conditions when said vehicle must remain on the surface.

3. The observation vehicle recited in claim 1 wherein said means for lifting said vehicle vertically, maintaining and rotating it at a point above the surface, and returning it to the surface comprise:
    gas bags and means for introducing and releasing gas into and out of said bags so that said vehicle can be operated as a lighter-than-air craft,
    multiple extendible lines between the surface and said lighter-than-air craft, and
    winches connected to said extendible lines and anchored to the ground in such a manner as to provide control of the vertical position and rotational orientation of said vehicle through the coordinated extension and contraction of said extendible lines.

4. The observation vehicle recited in claim 1 wherein said means for lifting said vehicle vertically, maintaining and rotating it at a point above the surface, and returning it to the surface comprise gas-filled bags and multiple electrically driven rotors with vertical axes of rotation which can be altered in angle about both horizontal axes.

5. The observation vehicle recited in claim 1 wherein said means for lifting said vehicle vertically, maintaining and rotating it at a point above the surface, and returning it to the surface comprise:
    gas bags and means for introducing and releasing gas into and out of said bags so that said vehicle can be operated as a lighter-than-air craft.
    a double pantograph extending between the vehicle gondola and the vehicle's ground nest, and
    a turntable in said vehicle's ground nest having means for extension/retraction and rotation of said pantograph.

6. The lighter-than-air observation vehicle of claim 1 wherein said screen consists of a partially reflective film superimposed on said observation window.

7. The observation vehicle recited in claim 1 wherein said means for projecting a simulation of the scene observed through said window on a screen outside said window and the means for projecting images related to said scene on a screen adjacent to said window can, as a transitional and evolutionary measure, be provided in a fixed surface installation.

8. The observation vehicle recited in claim 1 wherein said insulated cable is incorporated in said extendible lines for providing electric power to said vehicle.

* * * * *